May 3, 1932.  G. C. HOWARD  1,856,558
PROCESS OF TREATING WASTE SULPHITE LIQUOR
Filed March 12, 1930
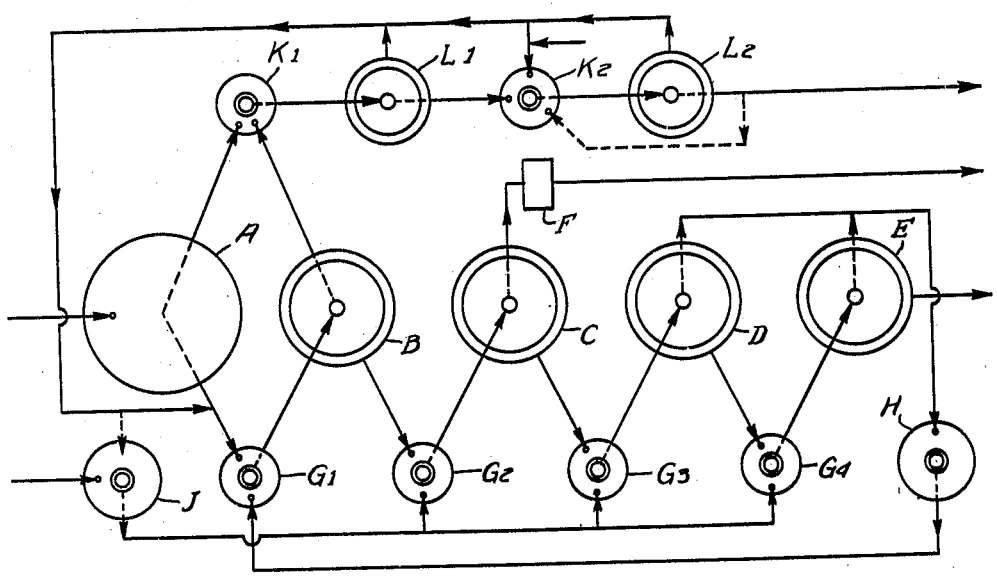
INVENTOR
Guy C. Howard
BY
ATTORNEYS.

Patented May 3, 1932

1,856,558

UNITED STATES PATENT OFFICE

GUY C. HOWARD, OF WAUSAU, WISCONSIN

PROCESS OF TREATING WASTE SULPHITE LIQUOR

Application filed March 12, 1930. Serial No. 435,107.

The present invention relates to improvements in the process disclosed and broadly claimed in my application Serial No. 435,009 filed March 11th, 1930, for the reissue of U. S. Patent No. 1,699,845 granted January 22, 1929.

In the process of said patent I treat waste sulphite liquor resulting from the digestion of wood in pulp making with caustic lime in solid phase form in order to decompose the major portion of the calcium lignin sulphonic acid constituent which is dissolved in said waste liquor. Such reaction can be brought about by adding caustic lime to the waste liquor until an inorganic and a yellow flocculated organic precipitate are formed. This flocculated precipitate first makes its appearance when the alkalinity of the system reaches about $pH=10.5$ and by increasing the alkalinity to about $pH=12$ the major portion of the lignin constituent may be decomposed and precipitated at room temperature or higher.

At this point a serious lag in the reaction occurs which seems to be due to the fact that the flocculated precipitate adheres to the solid lime particles and masks them. At this stage I separate the solid matter from the liquid, which can be done with ease either by settling and decantation or by filtration. Such solid matter constitutes the lignin recovery of the process in its preferred form. It is admixed with small crystals of calcium sulphite and sulphate.

The residual liquor at this time still contains a large percentage of the calcium lignin sulphonic acid constituent of the original waste liquor which can be decomposed and precipitated by the further addition of caustic lime, which reaction is preferably brought about under conditions very favorable to the obtaining of a maximum recovery of lignin due to the fact that the liquor has been freed from the flocculated precipitate and the lime particles which are added after such solid matter has been separated from the liquor are not seriously masked. Furthermore since the solid material obtained by this last step or steps does not necessarily form any part of the lignin recovery but is preferably used in sludge form as a reagent in the process for the initial treatment of the waste sulphite liquor, caustic lime in generous excess can be added to the system at this point, and a substantially, complete precipitation of lignin material obtained. The liquid portion of this mixture is readily separated by settling and decantation or filtration. It contains the carbohydrate constituents of the original waste liquor and may be run to the sewer or treated for recovery of such ingredients. The solids in the form of a sludge are preferably used as above mentioned.

The present invention differs from the process specifically disclosed in said patent in that; whereas, according to one form of the invention covered by my said patent the sludge reagent, hereinafter referred to as the secondary reagent, is used for supplying the caustic lime for reacting upon the waste liquor up to and including the precipitation of the major portion of the lignin sulphonic acid constituents, with my present invention the secondary reagent furnishes the caustic lime for reacting upon the waste liquor only up to the point of alakalinity where the flocculated precipitate begins to appear and thereupon the solids are separated and treated to obtain a maximum recovery of inorganic matter admixed with a minimum quantity of organic matter and the residual liquor is treated with fresh caustic lime reagent, hereinafter referred to as primary reagent, to effect a precipitation of the major portion of the lignin constituent thereof and to carry out the subsequent steps of the process up to and including the forming of the secondary reagent.

One great advantage in using all of the secondary reagent for the purpose of raising the alkalinity of the waste sulphite liquor up to the point where the inorganic solids are separated from the system, is that the secondary reagent contains a considerable quantity of the same inorganic solids which are to be so separated viz., crystals of $CaSO_3$ together with some crystals of $CaSO_4$. Therefore the recovery of such material is increased as compared with a process in which some of the secondary reagent is used in a later stage of the process beyond the point at which the inorganic material is separated.

The present invention furthermore includes a novel treatment of the solids first recovered from the waste liquor for the purpose of reducing to a minimum their organic or lignin content.

I have discovered that when ever crystals of calcium monosulphide are formed or are present in a waste sulphite liquor system there is an adsorbed film of organic matter on the surface of such crystals which evidently cannot be fully dissolved away in even a dilute waste sulphite liquor system prior to complete solution of the calcium sulphite crystals themselves. Since the presence of this organic matter is due to adsorption phenomena its quantity varies with the surface area of the calcium sulphite crystals and can be reduced by increasing the size of said crystals thereby decreasing their surface area according to the well known rule of relation of mass to surface area. (For example, a cube having double the dimensions of another cube contains 8 times the mass of the second cube, but has the surface area only 4 times the second cube.) My process has for one of its objects the promotion of calcium monosulphite crystal growth in order to decrease the mass of the organic material adsorbed per unit mass of the crystalline material. The process may be carried out in various ways one of which I shall describe in detail, reference being made to the accompanying drawing which shows a flow sheet of the improved process, the apparatus used being of usual or known form.

In my Patent No. 1,699,845, in describing the preferred manner of practising the invention, I describe the process as beginning at the point where fresh calcium oxide or hydroxide "primary lime reagent" is added to the system, and describe a cycle of operations which starts and ends at that point.

In order to avoid confusion and to more clearly bring out the difference between the present and the former manner of practising the invention as above referred to, I shall in like manner describe a cyclic process which starts and ends at the point where "primary lime reagent" is first added to the system, as follows:

*Step 1.*—This step consists in adding an alkaline earth metal base in solid phase form (e. g. caustic lime) regarded as a primary reagent to partially processed waste sulphite liquor from which a mixed precipitate of inorganic crystals (largely $CaSO_3$) and some yellow flocculated organic matter has already been precipitated and removed by previous treatment of raw waste sulphite liquor with secondary reagent to an alkalinity around pH=10.5, at which alkalinity yellow flocculated organic matter is present, and adding said primary reagent in such amount as to increase said alkalinity to around pH=12.0 and thus to effect a further precipitation of said mixture of inorganic crystals and yellow flocculated organic matter until the amount of such flocculated organic precipitate so thrown down constitutes a major portion of the lignin component of the mixture of original waste sulphite liquor and secondary reagent. This reaction occurs in reaction tank G 2 the primary reagent being supplied from storage tank J and the partially processed waste sulphite liquor from settling tank B. The reaction is followed by the removal of said precipitate by settling in settling tank C, decantation, and withdrawal at filter F as a finished product of the process which constitutes the recovered lignin product.

*Step 2.*—To the filtrate or decant from Step 1 more primary reagent (e. g. caustic lime in solid phase form) is added in reaction tank G 3 and in an amount which constitutes an excess of said reagent in relation to the molecular reaction requirement whereby organic matter is precipitated. The alkalinity of the system is thereby increased somewhat and a further precipitation of the aforesaid mixture of inorganic crystals and yellow flocculated organic matter is produced, and associated with this mixed precipitate is the unconsumed reagent in solid phase form.

The above mixed precipitate together with its associated unconsumed reagent is removed from the system by settling in settling tank D and decantation or filtration, and the solids thus removed constitute secondary reagent which is received in tank H and thence returned to the process at a point of lower alkalinity, as will be hereinafter described.

*Step 3.*—To the decant or filtrate from Step 2 more primary reagent (e. g. caustic lime in solid phase form) is added in reaction tank G 4 and likewise in an amount which constitutes an excess of said reagent in relation to the molecular requirements of the system at this stage. The alkalinity of the system is, normally, not increased by this addition of reagent since it is already at a maximum of alkalinity. This reagent addition, however, effects a further precipitation of a mixed precipitate which is associated with unconsumed reagent and is similar in all respects to that of Step 2, save in lesser amount.

The above mixed precipitate together with its associated unconsumed reagent is removed from the system by settling in settling tank E and decantation or filtration, and the solids thus removed constitute secondary reagent to be received in tank H and thence returned to the system as above referred to. The decant or filtrate constitutes the tail liquor of the process and is discharged direct to sewer or given further treatment for the recovery of additional values.

The objective of Steps 2 and 3 inclusive is to effect completeness of precipitation of organic matter through subjecting the decant liquors from Step 1 to the action of a relatively large excess of solid phase primary reagent, and this excess can be in generous amount because all unconsumed reagent goes into the secondary reagent and is used in the process. Steps 2 and 3 inclusive are preferably carried out in the two stages as described but in principle this stripping action can be done in one operation or can be expanded into two or more such primary reagent additions with intermediate decantation or filtration.

*Step 4.*—This step consists in adding to the incoming raw waste sulphite liquor in reaction tank G 1 all the secondary reagent which has originated from Steps 2 and 3. Such waste sulphite liquor is ordinarily the normal mixture of blow pit and side relief liquors. The resulting reaction changes the waste sulphite liquor from its original acidity of $pH=3$ or below to an alkalinity of around $pH=10.5$ at which point some flocculated yellow organic precipitate is present. The purpose here is to carry the system to, but not materially beyond, the distinct flocculation point and thereby yield a condition which permits of ready settling and decantation of precipitated matter. Prior to reaching this flocculation point the system goes through a stage from about $pH=9$ to $pH=10.5$ in which it is practically impossible to effect settling and decantation to yield a clear decant and in this stage it is almost impossible to separate precipitated matter by filtration due to the presence of dispersed colloidal organic matter and to the extreme fineness of the inorganic crystals resulting from this reaction.

The addition of the secondary reagent has decomposed the original waste sulphite liquor to yield a mixed precipitate consisting of $CaSO_3$ crystals together with some $CaSO_4$ crystals and admixed with some flocculated organic precipitate. It is desired to avoid the formation here of an excessive amount of this flocculated organic precipitate and this is controlled by regulating the amount of secondary reagent currently added and in turn the amount of secondary reagent currently produced is reguluated and controlled by the amount of primary reagent added in the stripping Steps 2 and 3.

The precipitated solids are removed from the system by settling in settling tank B and decantation and constitute the crude inorganic product of the process which is treated further as will be described. The decant liquors from tank B constitute the partially processed waste sulphite liquor referred to in Step 1. It remains now to treat the crude inorganic product from Step 4 to dissolve and separate as far as practical the organic precipitate associated in this crude product with the inorganic crystals which are $CaSO_3$ together with a minor amount of $CaSO_4$ and thereby secure a refined inorganic produce for use in making fresh cooking acid or for other purposes.

*Step 5.*—The crude inorganic product currently withdrawn in Step 4 which has an alkalinity around $pH=10.5$ is transferred from tank B to a reaction tank K 1 and treated with a sufficient amount of the raw waste sulphite liquor from tank A to lower the alkalinity of this crude inorganic product from $pH=10.5$ to around $pH=7$. A reaction is thereby effected between the raw waste sulphite liquor and the organic precipitate in this crude product whereby the organic precipitate is substantially all decomposed and dissolved while the inorganic components in the crude product are not altered nor dissolved save in such amount as represents the difference in solubility between $pH=10.5$ and $pH=7$.

The discharge from the reaction tank K 1 passes to settling tank L 1. The overflow from this settling tank returns to the main process line at tank G 1 along with the incoming raw waste sulphite liquor. The settled solids from this settling tank L 1 are withdrawn as underflow and constitute semi-refined inorganic product. This is essentially $CaSO_3$ together with a minor amount of $CaSO_4$ and exclusive of the associated mother liquor the solids contain practically no organic matter save that which may be present as an adsorbed film on the surface of the $CaSO_3$ crystals. The temperature of the system in the tanks K 1 and L 1 is normally above $50°$ C. and may be as high as $80°$ C. or even $100°$ C.

*Step 6.*—Increasing the acidity of the liquor (i. e. lowering its pH value alone) is not effective to remove this adsorbed organic matter. To reduce this organic component I so treat the $CaSO_3$ material as to cause a growth in crystal size and hence effect a reduction of crystal surface area per unit of mass on which the organic matter can adsorb. This may be accomplished by subjecting the $CaSO_3$ crystals to treatment for a sufficiently long time under such conditions as give (1) the maximum solubility of $CaSO_3$, (2) the minimum supersaturation coefficient and (3) the minimum influence of viscosity and colloidal factors, which are feasible under commercial operations and supplementing these conditions, if desired by seeding the system with larger $CaSO_3$ crystals. The solubility of $CaSO_3$ will depend on temperature conditions and on the presence of other ionizable calcium salts. It is appreciably more soluble in cold than in hot solutions, hence cold conditions should be maintained. The other calcium salts present in this semi-refined product (either as solids or in solution in the sludge mother liquor) are in general $CaSO_4$-calcium lignin sulphonate and some calcium bisulphite. The influence of the $CaSO_4$ and calcium lignin sulphonate are largely beyond control. The amount of calcium bisulphite present will depend on the pH value of the system. The supersaturation coefficient (2) and the viscosity factor (3) are practically beyond control. The relative influence of these several factors is not shown with certainty but I have found the preferred treatment favoring the growth of these crystals consists in mixing this semi-refined inorganic product for a prolonged time in cold aqueous liquors at conditions below $pH=7$ and seeding the system by returning some of the enlarged crystals resulting from the treatment.

The semi-refined inorganic product as underflow from settling tank L 1 is transferred to reaction tank K 2 and mixed with a regulated and relatively large amount of wash liquor which normally will consist of cold water to which is added (when necessary) just enough acid substance to maintain the desired conditions for this treatment of below $pH=7$. Such acid substance may be for example raw waste sulphite liquor or preferably raw cooking acid or straight sulphurous acid since these latter will contain practically no dissolved organic matter. To this K 2 tank there may also preferably be added some enlarged seeding crystals in the form of the sludge underflow of refined product from subsequent settling tank L 2. The material is maintained in this tank K 2 with mild stirring for a sufficiently long time and then discharged to settling tank L 2. The decant overflow from this tank L 2 may be returned (i. e. cycled) in whole or in part as the wash liquor added to tank K 2 but is finally withdrawn and added to the main process line along with incoming raw waste sulphite liquor or may even be used as make-up liquor for the primary reagent. The settled solids withdrawn as underflow from settling tank L 2 constitute the refined inorganic product of the process (in sludge form) or if further refinement is desired a similar additional treatment may be given in apparatus similar to K 2 and L 2 but not shown.

This refined inorganic product is largely $CaSO_3$ together with a minor amount of $CaSO_4$ and contains only such minor amounts of organic matter as are still adsorbed to the surfaces of the $CaSO_3$ crystals.

The entire process thus described is preferably a continuous operation but may, if desired, be carried out on a batch basis. It has accomplished the segregation of the raw waste sulphite liquor into three major products namely (1) an inorganic product consisting largely of $CaSO_3$ which may be used for making fresh cooking acid or for other purposes (2) a solid organic product which usually constitutes around 90% of the lignin constituents present in the raw waste sulphite liquor and with which is associated some inorganic matter and which product may be used for making products of value or burned for fuel, (3) a tail liquor product which contains substantially all the carbohydrate components of the raw waste sulphite liquor together with some combined inorganic matter and the residual unrecovered lignin material.

I claim:

1. The process of treating waste sulphite liquor, which comprises adding thereto caustic lime to precipitate crystals of $CaSO_3$, subjecting said crystals to treatment conducive to crystal growth, and recovering said crystals.

2. The process of minimizing the quantity of adsorbed organic matter upon the surfaces of $CaSO_3$ crystals obtained by precipitation from waste sulphite liquor, which consists in treating said crystals for a prolonged time with cold aqueous liquor maintained at a pH value below $pH=7$, and thereupon separating said crystals therefrom.

3. The process of minimizing the quantity of adsorbed organic matter upon the surfaces of $CaSO_3$ crystals obtained by precipitation from waste sulphite liquor, which consists in treating said crystals for a prolonged time with cold aqueous liquid maintained at a pH value below $pH=7$, seeding the system with large $CaSO_3$ crystals, and separating the crystals from said liquid.

4. The process of minimizing the quantity of adsorbed organic matter upon the surfaces of $CaSO_3$ crystals obtained by precipitation from waste sulphite liquor, which consists in treating said crystals for a prolonged time with cold aqueous liquid maintained at a pH value below $pH=7$, seeding the system with large $CaSO_3$ crystals returned to the system after previous treatment therein for promotion of growth, and separating the crystals from said liquid.

5. The process of minimizing the quantity of adsorbed organic matter upon the surfaces of $CaSO_3$ crystals obtained by precipitation from waste sulphite liquor, which consists in agitating said crystals for a prolonged time with cold aqueous liquid maintained at a pH value below $pH=7$, and separating said crystals therefrom.

6. The process of treating waste sulphite liquor, which comprises reacting thereon with caustic lime in solid phase form to produce a mixed precipitate of CaSO₃ crystals and precipitated flocculated organic matter, decomposing and dissolving said organic matter, and thereupon separating said crystals from the solution of organic matter, and treating the same to increase the average size thereof by crystal growth.

7. The process of treating waste sulphite liquor with caustic lime in solid phase form which comprises reacting upon the same with a mixture of caustic lime, a solid, inorganic calcium salt, and lignin containing solid material until the alkalinity of the mixture is sufficiently high to cause the calcium lignin sulphonic acid component of such liquor to begin to decompose to form a flocculated precipitate and to enable the solids which are present to be readily settled to yield a clear decant, the quantity of caustic lime so added being insufficient to decompose and precipitate the major portion of the lignin sulphonic acid component of the liquor, separating solids from liquid and treating the liquid with caustic lime free from admixed lignin containing material to decompose the major portion of the lignin sulphonic acid component of said liquid and form a lignin containing flocculated precipitate.

8. The process of treating waste sulphite liquor with caustic lime in solid phase form which comprises reacting upon the same with a mixture of caustic lime, a solid, inorganic calcium salt and lignin containing solid material until the alkalinity of the mixture is approximately pH=10.5 and a precipitate which is largely inorganic is obtained in substantial quantity, separating solids from liquid and treating the liquid with caustic lime free from admixed lignin containing material to decompose the major portion of the lignin sulphonic acid component of said liquid and form a lignin containing flocculated precipitate.

9. The process of treating waste sulphite liquor with caustic lime in solid phase form which comprises reacting upon the same with a mixture of caustic lime, a solid, inorganic calcium salt and lignin containing solid material until the alkalinity of the mixture is sufficiently high to cause the calcium lignin sulphonic acid component of such liquor to begin to decompose to form a flocculated precipitate and to enable the solids which are present to be readily settled to yield a clear decant, the quantity of caustic lime so added being insufficient to decompose and precipitate the major portion of the lignin sulphonic acid component of the liquor, separating solids from liquid and treating the liquid with caustic lime free from admixed lignin containing material to decompose the major portion of the lignin sulphonic acid component of said liquid and form a lignin containing flocculated precipitate, separating solids from liquid and treating the liquid with caustic lime free from admixed lignin containing material to decompose substantially all of the remaining lignin sulphonic acid component of said lignin and form a lignin containing flocculated precipitate.

10. The process of treating waste sulphite liquor with caustic lime in solid phase form which comprises reacting upon the same with a reagent mixture of caustic lime and lignin containing solid material until the alkalinity of the mixture is sufficiently high to decompose the calcium lignin sulphonic acid component of such liquor and to enable the solids which are present to be readily settled to yield a clear decant, separating solids from liquid and reacting on the solids with waste sulphite liquor and without the addition of any of said reagent mixture to largely decompose and dissolve the lignin containing component thereof.

11. The process of treating waste sulphite liquor with caustic lime in solid phase form which comprises reacting upon the same with a reagent mixture of caustic lime and lignin containing solid material until the alkalinity of the mixture is approximately pH=10.5, separating solids from liquid and reacting on the solids with waste sulphite liquor and without the addition of any of said reagent mixture to largely decompose and dissolve the lignin containing component thereof.

12. The process of treating waste sulphite liquor which comprises raising the pH value thereof to approximately 10.5 by means of a reagent mixture of caustic lime and lignin containing material previously precipitated from waste sulphite liquor by the action of caustic lime, separating solids and liquid, reacting upon waste sulphite liquor with said solids, and without the addition of any of said reagent mixture, to raise the pH value of the waste sulphite liquor and to decompose and dissolve substantially all of the lignin-containing material except such as may be adsorbed on the surface of inorganic calcium crystals, and thereupon separating solids and liquid.

13. The process of treating waste sulphite liquor which comprises raising the pH value thereof to approximately 10.5 by means of a reagent mixture of caustic lime and lignin containing material previously precipitated from waste sulphite liquor by the action of caustic lime, separating solids and liquid, reacting upon waste sulphite liquor with said solids, and without the addition of any of said reagent mixture, to raise the pH value of the waste sulphite liquor to approximately 7, and to decompose and dissolve substantially all of the lignin-containing material except such as may be adsorbed on the surface of inorganic calcium crystals, and thereupon separating solids and liquid.

14. The process of treating waste sulphite liquor which comprises raising the pH value thereof to approximately 10.5 by means of a reagent mixture of caustic lime and lignin containing material previously precipitated from waste sulphite liquor by the action of caustic lime, separating solids and liquid, reacting upon waste sulphite liquor with said solids, and without the addition of any of said reagent mixture, to raise the pH value of the waste sulphite liquor and to decompose and dissolve substantially all of the lignin-containing material except such as may be adsorbed on the surface of inorganic calcium crystals, and thereupon separating solids and liquid, and adding the liquid to the system at a point where the pH value of the waste sulphite liquor is being raised to that at which said flocculated precipitate first appears.

15. The process of treating waste sulphite liquor which comprises reacting thereon with caustic lime in solid phase form mixed with a solid, inorganic calcium salt and lignin-containing solid material up to but not substantially beyond the pH value at which a flocculated precipitate first occurs, separating the solids from the liquid, reacting on said solids with waste sulphite liquor to decompose and dissolve lignin-containing material and to precipitate inorganic calcium salts, and reacting on the residual liquid with fresh caustic lime in solid phase form and substantially free from admixed lignin-containing material.

16. A process of treating waste sulphite liquor, which comprises adding thereto as reagent a mixture of caustic lime in solid phase form, a solid, inorganic calcium salt and a solid lignin-containing material which has been precipitated from waste sulphite liquor by means of caustic lime, to react thereon to dissolve said lignin-containing material and to precipitate inorganic calcium salts, sufficient reagent being added to bring the liquor to but not substantially beyond the pH value at which a flocculated precipitate first occurs, thereupon separating the solids from the liquid and treating the latter with fresh caustic lime in solid phase form and substantially free from admixed lignin-containing material, to precipitate a large part of the lignin, and separating said precipitate from the liquid.

17. The process of treating waste sulphite liquor which comprises reacting thereon with caustic lime in solid phase form until the pH value of the liquid is approximately as high as 10.5, separating the solids from the liquid and adding them to waste sulphite liquor, until the pH value of the liquid is approximately 7, and thereupon separating the solids from said liquid.

18. The process of treating waste sulphate liquor which comprises reacting thereon with a mixture of a lignin containing precipitate obtained by treatment of waste sulphite liquor and caustic lime in solid phase form until the pH value of the liquid is approximately as high as 10.5, separating the solids from the liquid and adding them to waste sulphite liquor, until the pH value of the liquid is approximately 7, and thereupon separating the solids from said liquid.

In testimony whereof, I have signed my name hereto.

GUY C. HOWARD.

CERTIFICATE OF CORRECTION.

Patent No. 1,856,558.  May 3, 1932.

GUY C. HOWARD.

It is hereby certified that error appears in the printed specification of the above numbered patent requiring correction as follows: Page 1, line 74, for "constituents" read constituent; page 2, line 21, for "monosulphide" read monosulphite; and page 6, line 63, claim 18, for "sulphate" read sulphite; and that the said Letters Patent should be read with these corrections therein that the same may conform to the record of the case in the Patent Office.

Signed and sealed this 5th day of July, A. D. 1932.

(Seal)

M. J. Moore,
Acting Commissioner of Patents.